July 28, 1925.
S. L. COLE
1,547,903
ICE CREAM AND CAKE DISPENSING CUP
Filed May 31, 1924
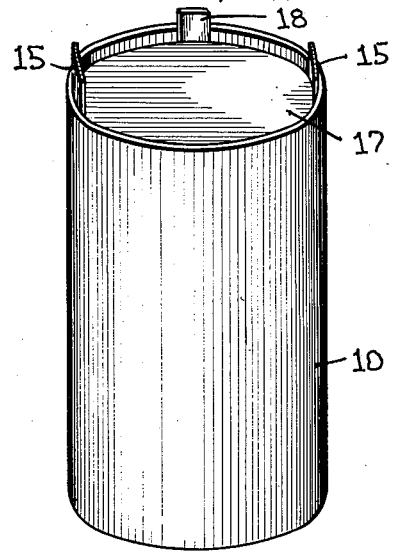
Fig.1.
Fig.2.
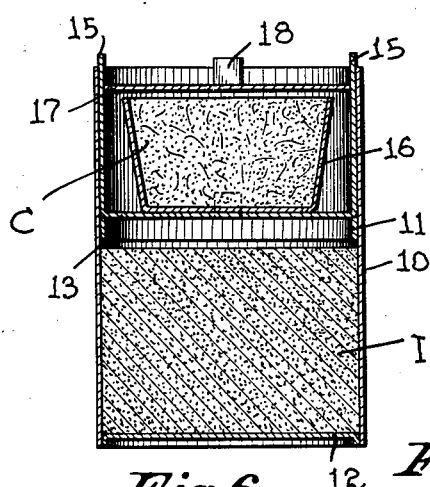
Fig.3.
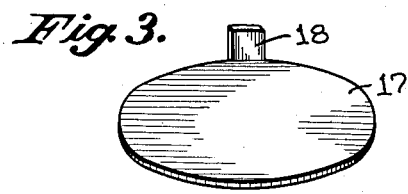
Fig.4.
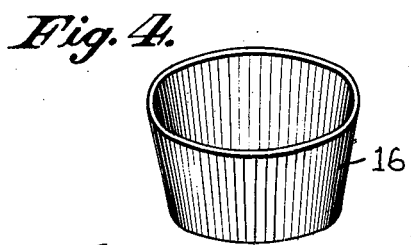
Fig.5.
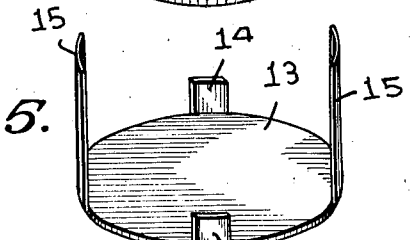
Fig.6.
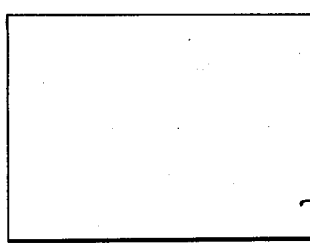
Inventor:
SAMUEL LEWIS COLE.
By
His Attorney Patented July 28, 1925.

1,547,903

UNITED STATES PATENT OFFICE.

SAMUEL LEWIS COLE, OF WASHINGTON, DISTRICT OF COLUMBIA.

ICE-CREAM AND CAKE DISPENSING CUP.

Application filed May 31, 1924. Serial No. 717,179.

*To all whom it may concern:*

Be it known that I, SAMUEL LEWIS COLE, a citizen of the United States, residing at Washington, in the District of Columbia, have invented certain new and useful Improvements in Ice-Cream and Cake Dispensing Cups, of which the following is a specification.

My said invention relates to a container or cup for use in dispensing ice cream and cake or other materials in paper cartons to the retail trade.

It is an object of the invention to provide a container or cup having an ice cream compartment and a separate and distinct compartment for cake said compartments being closed in a manner to prevent commingling of the materials.

Referring to the accompanying drawings which are made a part hereof and on which similar reference characters indicate similar parts, Fig. 1 is a plan view of my device.

Fig. 2 is a central longitudinal section.

Fig. 3 is a plan view of the closure for the container.

Fig. 4 is a plan view of the cake holding receptacle.

Fig. 5 is a plan view of the dividing partition, and

Fig. 6 is a view of the blank of which the container is formed.

In the drawings, reference character 10 indicates the wall of a container or cup preferably formed of a rectangular sheet of cardboard with an integral tongue 11. In forming the container the tongue 11 is first formed in the shape of the cross section of the container and the body of the container 10 is formed around the tongue and fastened in any preferred manner so that said tongue will form an annular ledge as shown in Fig. 2. A bottom 12 is fastened in any desired manner at the lower end of the container and coacts with a partition member 13 to retain ice cream or any other desired material within the lower end of the container. The partition member 13 is formed with upstanding diametrically opposed arms 14 which serve to strengthen the body of the partition and also maintain the same in position against the edge of the annular ledge 11. The partition member is also provided with a second pair of diametrically opposed arms 15 spaced at about 90° from the arms 14. Each of this second pair of arms is of sufficient length to extend slightly above the top of the container to be easily grasped in removing the partition 13 for gaining access to the contents of the lower compartment of the container. A receptacle 16, preferably having a flared open top is provided for the reception of cake C or other material and is adapted to be removed from the container when the partition 13 is removed by grasping the upstanding arms 15, the arms 14 and 15 serving to prevent spilling the receptacle and its contents. A cover or closure 17 is provided preferably having an integral tab 18 by which the same may be removed from the container.

The shape of the receptacle is such as to permit the insertion of a spoon or the like around the same if desired.

From the foregoing it will be seen that a very compact and desirable package is provided having a pleasing and an attractive appearance and which will assist in the dispensing of the materials contained.

It will be obvious that my device may be used for other combinations of materials and various modifications of structure will also be apparent to those skilled in the art, therefore I do not limit myself to what is shown in the drawings and described in the specification but only as indicated in the appended claims. Preferably the container is coated or impregnated to render it impervious to fluids.

Having thus fully described my said invention what I claim as new and desire to secure by Letters Patent, is:

1. A paper carton formed from a rectangular blank having a ledge forming tongue extending from one edge thereof said blank being rolled to cylindrical form with said tongue forming an interior ledge on the inner surface of the carton, substantially as set forth.

2. A cylindrical carton having an interior ledge, a disk removably mounted on said ledge said disk having two diametrically opposed lifting arms extending beyond the upper end of the carton, and relatively short upstanding strengthening and bracing tabs on portions of the periphery spaced from said lifting tabs, substantially as set forth.

3. A paper carton formed from a rectangular blank having a ledge forming tongue extending from one edge thereof said said blank being rolled to cylindrical form with said tongue forming an interior ledge on the inner surface of the carton, a disk removably mounted on said ledge dividing the container into compartments said partition having a pair of upstanding arms extending above the top of the container serving as lifting tabs, a receptacle on said partition adapted to be removed in conjunction therewith, a closure for the lower end of said container, and a removable closure for the upper end of said container, substantially as set forth.

4. A cylindrical carton having an interior ledge intermediate its ends, a disk removably mounted on said ledge separating the carton into compartments such disk having two pairs of diametrically opposed upstanding arms serving as strengthening and bracing tabs with one pair of said arms extending above the top of the container to serve as lifting arms, a closure for the ends of said carton, a receptacle in said carton resting on said disk and adapted to be removed in junction with the removal of said disk adapted to be held thereon by said upstanding arms, substantially as set forth.

In witness whereof, I have hereunto set my hand and seal at Washington, District of Columbia, this 30th day of April, A. D. nineteen hundred and twenty-four.

SAMUEL LEWIS COLE. [L. S.]